United States Patent [19]

Jacobson

[11] 4,400,581
[45] Aug. 23, 1983

[54] INCOMING AUDIO DETECTION CIRCUIT FOR A SPEAKER TELEPHONE

[76] Inventor: Sava Jacobson, 8130 Orion St., Van Nuys, Calif.

[21] Appl. No.: 203,353

[22] Filed: Nov. 3, 1980

[51] Int. Cl.³ .............................................. H04M 1/60
[52] U.S. Cl. .............................. 179/1 HF; 179/1 VC; 179/81 B
[58] Field of Search .............. 179/1 H, 1 HF, 1 VC, 179/100 L, 81 B; 455/79

[56] References Cited

U.S. PATENT DOCUMENTS

| | | | |
|---|---|---|---|
| 3,751,602 | 8/1973 | Breeden | 179/1 HF |
| 4,002,854 | 1/1977 | Penrose | 179/1 HF X |
| 4,317,959 | 3/1982 | Kuriki | 179/1 VC |

FOREIGN PATENT DOCUMENTS 2215837 10/1973 Fed. Rep. of Germany ... 179/1 VC

Primary Examiner—G. Z. Rubinson
Assistant Examiner—James L. Dwyer

[57] ABSTRACT

In this incoming audio detection circuit for a speaker telephone, an impedance element is connected between the output of the microphone amplifier and the telephone line terminals. Speech signals present at each end of the impedance element are respectively rectified but not filtered. The resultant rectified but unfiltered signals are compared. If only outgoing speech is present, the rectified signal derived from the microphone amplifier end of the impedance element will be of greater magnitude than, and will have a greater phase angle extent than the rectified signal derived from the telephone line end of the impedance element. A comparator senses this condition and maintains the speaker telephone in the outgoing audio mode. In the presence of incoming speech, instants will occur when the magnitude of the rectified signal derived from the telephone line exceeds that of the rectified signal derived from the microphone amplifier. In response to this condition, the comparator causes the speaker telephone immediately to switch to the mode in which incoming speech is reproduced by a loudspeaker.

7 Claims, 19 Drawing Figures

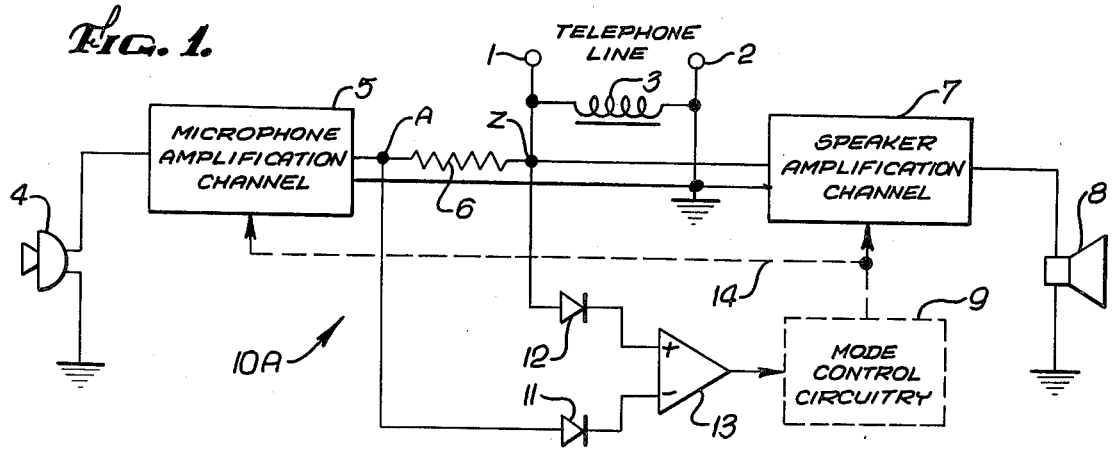
FIG. 1.
OUTGOING SIGNAL ONLY
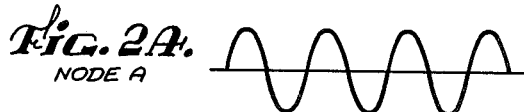
FIG. 2A. NODE A
FIG. 2C. RECTIFIER-11 OUTPUT
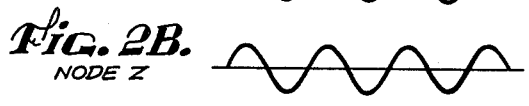
FIG. 2B. NODE Z
FIG. 2D. RECTIFIER-12 OUTPUT
FIG. 2E. COMPARATOR-13 OUTPUT
INCOMING SIGNAL ONLY
FIG. 2F. NODE A
FIG. 2H. RECTIFIER-11 OUTPUT
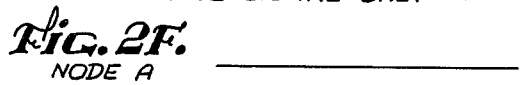
FIG. 2G. NODE Z
FIG. 2I. RECTIFIER-12 OUTPUT
FIG. 2J. COMPARATOR-13 OUTPUT
BOTH OUTGOING AND INCOMING SIGNALS
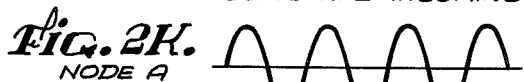
FIG. 2K. NODE A
FIG. 2M. RECTIFIER-11 OUTPUT
FIG. 2L. NODE Z
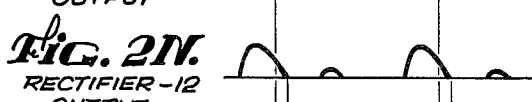
FIG. 2N. RECTIFIER-12 OUTPUT
FIG. 2P.
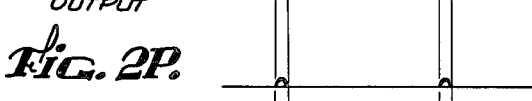
FIG. 2Q. COMPARATOR-13 OUTPUT

INCOMING AUDIO DETECTION CIRCUIT FOR A SPEAKER TELEPHONE

BACKGROUND OF THE INVENTION

1. Field of the Invention

The present invention relates to a speaker telephone, and particularly to a circuit for detecting the presence of audio incoming from the telephone line while the user is speaking. The application relates to the inventor's Disclosure Document No. 087,715 filed in the U.S. Patent Office on Jan. 29, 1980.

2. Description of the Prior Art

In a speaker telephone, the user's voice is picked up by a microphone and amplified for transmission to the telephone line. When the other party begins to speak, appropriate detection circuitry disables microphone transmission and enables amplification and loudspeaker reproduction of the incoming audio.

Implementation of the incoming audio detection circuitry poses certain difficult problems. If the user is talking at the same time that the other party begins to speak, both outgoing and incoming audio signals simultaneously are present at the telephone line connections to the speaker telephone. Typically, the outgoing signal is 15 db louder than the incoming signal. Thus the detection circuitry must distinguish between two speech signals of significantly different magnitude that are both present across the same pair of terminals.

In some prior art speaker telephones the problem is avoided by detecting the incoming signal only during pauses in the user's speech, when no outgoing signal is present. In such systems, the other party cannot effectively interrupt while the user is talking, and such party may experience an objectionable delay before the user recognizes that he has begun to speak.

Another approach to incoming signal detection involves the use of a directional coupler. A directional coupler works by reason of polarity. Typically, two transformers are connected to the telephone line in such a way that there is a polarity sense which permits separation of outgoing and incoming signals. However, such a directional coupler arrangement is very much dependent on telephone line impedance. In practice, different telephone lines exhibit different impedances, and the impedance of a particular line may change from time to time, both in resistive and reactive components. Should this occur, the ability of a directional coupler to separate incoming and outgoing signals may be substantially degraded. Thus the use of a directional coupler is not preferred from a standpoint of reliability.

In other speaker telephones a high frequency sampling method is used to detect incoming speech while the user is talking. Complex circuitry is required to sample the line at very rapid intervals with the objective of detecting a signal at the telephone line at an instant when no voice is picked up by the microphone.

A principal objective of the present invention is to provide a cost effective, simple circuit for detecting an incoming signal while the user of a speaker telephone is talking.

SUMMARY OF THE INVENTION

This objective is achieved by a circuit which compares the signals at opposite ends of an impedance element that is placed between the output of the microphone amplifier and the telephone line terminals of the speaker telephone. For outgoing speech, the signal level at the impedance element terminal connected to the microphone amplifier will be greater than the signal level at the telephone line terminals. For incoming speech the converse will be true. That is, the signal at the telephone line terminal will be greater in magnitude than the signal at the other end of the impedance element. This difference is maximized by configuring the microphone amplifier output circuitry so that it presents a zero impedance load to an incoming signal.

To accomplish the comparison, the signals at each end of the impedance element are rectified but not filtered. The resultant rectified signals are dynamically compared, e.g., by using an operational amplifier as a comparator. Advantageously, the op-amp comparator circuitry is arranged to provide an output of a first level so long as the rectifed signal from the microphone amplifier terminal of the impedance element is greater than the rectified signal from the telephone line terminals. This is the usual condition during outgoing speech when no signal is coming in from the telephone line.

If an incoming signal should occur while the user is talking, on a probability basis there will occur instants when the magnitude of the rectified signal from the telephone line end of the impedance element will exceed that of the rectified signal from the microphone amplifier end of the impedance element. Such condition immediately will cause the op-amp comparator to produce an output of a different level. This change in comparator output is used to control the mode changeover from outgoing speech transmission to incoming speech reception. Advantageously, but not necessarily, the change in comparator output level may alter the state of a bistable latch which in turn establishes the operational mode of the speaker telephone. In an embodiment disclosed herein, the op-amp comparator and bistable latch are configured as a single circuit.

Another feature of the invention is that the rectifier circuitry associated with the microphone amplifier end of the impedance element exhibits a greater conduction angle than the rectifier connected to the telephone line end of the impedance element. This insures that correct signal comparison, and hence correct mode control, will be achieved despite shifts in signal phase which might be introduced by changing impedance of the telephone line. Thus, the present speaker telephone will operate effectively and reliably despite substantial variation in telephone line impedance. Moreover, since a pause in the user's speech is not required for detection of the incoming signal, switchover to the incoming speech mode occurs without noticeable delay when the distant party begins to speak.

BRIEF DESCRIPTION OF THE DRAWINGS

A detailed description of the invention will made with reference to the accompanying drawings wherein:

FIG. 1 is an idealized electrical block diagram illustrating the operating principles of the inventive speaker telephone;

FIGS. 2A through 2Q show waveforms present in the circuit of FIG. 1 under idealized conditions in which the outgoing and incoming signals are both sine waves.

DESCRIPTION OF THE PREFERRED EMBODIMENT

Figure 3:
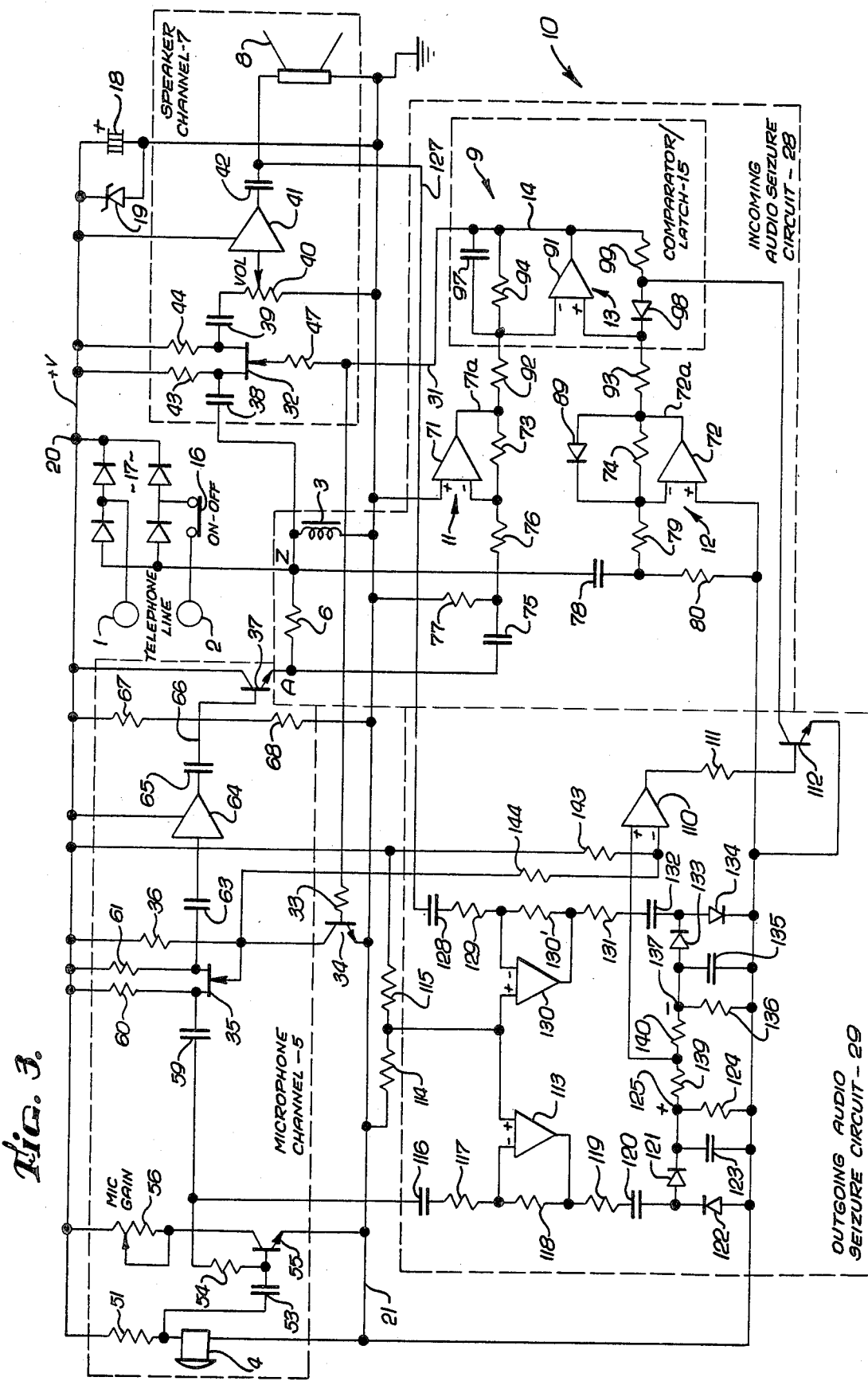
FIG. 3 is an electrical schematic diagram of a practical embodiment of the inventive speaker telephone utilizing the operating principle of the circuit of FIG. 1.

The following detailed description is of the best presently contemplated mode of carrying out the invention. This description is not to be taken in a limiting sense, but is made merely for the purpose of illustrating the general principle of the invention since the scope of the invention best is defined by the appended claims.

The principle of the invention is illustrated by the idealized speaker telephone circuit 10A of FIG. 1 and by the corresponding waveforms of FIG. 2. The circuit 10A is connected to the telephone line via the terminals 1 and 2. The line is loaded by an inductor 3. Outgoing audio is picked by a microphone 4, amplified in a microphone amplication channel 5 and supplied to the telephone line via a resistive impedance element 6. Audio received from the telephone line is amplified in a speaker amplification channel 7 and reproduced by a loudspeaker 8.

Mode control circuitry 9 ensures that when the microphone channel 5 is enabled to permit speech transmission, the speaker channel 7 will be disabled. In accordance with the present invention, the circuit 10A detects the presence of an incoming signal while the microphone channel 5 is enabled, and causes the mode control circuitry 9 to terminate speech transmission (by turning off the microphone channel 5) and to enable speech reception (by turning on the speaker channel 7).

The invention best can be understood in a conceptual manner by assuming, for descriptive purposes, that the outgoing microphone signal is a pure sine wave of one frequency, and that the signal incoming from the telephone line is a sine wave of another frequency.

With only an outgoing sine wave signal present, the waveform of FIG. 2A represents the output of the microphone amplifier channel 5 between the node A and ground. The outgoing signal also is present across the telephone line terminals 1 and 2, between the node Z and ground. As illustrated in FIG. 2B, this outgoing signal is lower in amplitude than the corresponding signal at node A (FIG. 2A) as a result of voltage division between the resistive impedance element 6 and the effective impedance across the telephone line terminals between the node Z and ground.

In accordance with the present invention, the circuit 10A employs two ideal rectifiers 11 and 12 to rectify without filtering the respective signals from the nodes A and Z. As described below in connection with FIG. 3, the ideal rectifiers 11 and 12 may be implemented in a practical circuit by the use of appropriately connected operational amplifiers. The rectifiers are "ideal" in that they present no forward voltage drop, thus rectifying down to the zero-crossing axis of even the weakest signal.

Advantageously, the rectifier 11 associated with the node A exhibits a conduction angle of a full 180°. As a result, the output of the rectifier 11 will have the waveform illustrated in FIG. 2C in the presence of an outgoing signal of sinusoidal shape. The signal from the rectifier 11 constitutes essentially a complete half wave of the signal present at the node A (FIG. 2A).

The rectifier 12 advantageously exhibits a conduction angle that is somewhat narrower (typically 90°) than that exhibited by the rectifier 11, irrespective of the magnitude of the voltage which is being rectified. Accordingly, in the presence of an outgoing sine wave signal only, the output from the rectifier 12 will have the waveform shown in FIG. 2D. The amplitude of the output pulses from the rectifier 12 are substantially the same as the amplitude of the signal at the node Z (FIG. 2B). However, the pulses represent somewhat less than a half wave of that signal. Hence, each of the pulses from the rectifier 12 (FIG. 2D) will be lower in amplitude than the corresponding pulses from the rectifier 11 (FIG. 2C) and will be of lesser phase angle extent than, and will be "contained within" the corresponding output pulse from the rectifier 11.

This relationship between the outputs of the rectifiers 11 and 12 is used in the incoming signal detection process. To accomplish this, the outputs of the rectifiers 11 and 12 are supplied respectively to the inverting (−) and non-inverting (+) inputs of an operational amplifier 13 that is used as a comparator. The comparator 13 produces a low level output signal so long as the input to the op-amp (−) terminal is greater in magnitude than the input at the op-amp (+) terminal. This will always be the case when only an outgoing signal is present. Under such condition, each and every output pulse from the rectifier 12 is always of lesser magnitude than, and "contained within" the corresponding pulse from the rectifier 11. Accordingly, in the presence of an outgoing signal only, the output of the comparator 13 remains at a low level, as represented by the waveform of FIG. 2E.

The waveforms of FIGS. 2F through 2J illustrate operation of the circuit 10A in the presence of only an incoming signal which is of sinusoidal shape, with a frequency different from that of the outgoing signal shown in FIG. 2A. The incoming signal, as present across the telephone line terminals 1 and 2 between the node Z and ground is shown in FIG. 2G. Advantageously, the output of the microphone channel 5 is an emitter follower or like circuit which provides essentially zero impedance load to a signal incoming from the telephone line. With such configuration, in the presence of an incoming signal only, the signal level between the node A and ground will be essentially zero, as illustrated in FIG. 2F. The use of such an emitter follower or like very low-impedance load maximizes the signal level difference between the nodes Z and A for an incoming signal.

Since there is essentially no incoming signal present at the node A, the ideal rectifier 11 also produces a zero output, as represented by the waveform of FIG. 2H. The ideal rectifier 12 conducts during a portion of the positive excursions of the signal present at the node Z, and thus produces the rectified, unfiltered output signal illustrated by the waveform of FIG. 2I. The positive excursions of this signal have an amplitude corresponding to that of the incoming waveform present at the node Z, but occur for somewhat less than the complete half wave of that signal owing to the relatively shorter conduction angle of the ideal rectifier 12.

A comparison of the waveforms of FIGS. 2H and 2I shows that each time a positive excursion signal from the ideal rectifier 12 (FIG. 2I) is supplied to the (+) terminal of the comparator 13, there is no concurrently supplied signal (FIG. 2H) at the (−) input terminal. As a result, the comparator 13 produces at its output a high level signal (FIG. 2J) corresponding in time to the occurrence of the input signal at the op-amp (+) terminal. This comparator 13 high level output signal may be used by the mode control circuitry 9 to switch the speaker telephone 10A from the outgoing to the incoming amplification mode.

For example, the mode control circuitry 9 may include a bistable latch having a first state in which a signal is provided on a line 14 to enable the microphone amplification channel 5 and disable the speaker amplification channel 7, and a second stable state in which the microphone channel 5 is disabled and the speaker channel 7 is enabled. With such arrangement, the initial high level output signal 13' (FIG. 2J) from the comparator 13 will cause the bistable latch to switch, and remain in the second stable state in which incoming speech amplification is enabled. The broken line in FIG. 2J represents the state of such a mode control bistable circuit. Thus when the speaker telephone 10A initially is in the audio transmission mode, but the user is not talking, as soon as an incoming signal occurs the comparator 13 will produce an output signal 13' that causes the latch in the mode control circuitry 9 to switch to the state in which incoming speech amplification is enabled.

Operation of the circuit 10A in the presence of both outgoing and incoming signals now can be understood in connection with the waveforms of FIGS. 2K through 2Q. In this example, the outgoing signal is the same sine wave as that illustrated in FIGS. 2A and 2B, and the incoming signal likewise is the sine wave of different frequency illustrated in FIG. 2G. Since the incoming signal is of essentially zero level at the node A, only the outgoing signal will be present between the node A and ground. Thus the waveform at node A (FIG. 2K) will be essentially the same as that present at the node A when only an outgoing signal exists.

Both the outgoing signal (corresponding to the waveform of FIG. 2B) and the incoming signal (FIG. 2G) will be present simultaneously between the node Z and ground. For illustrative purposes, these two signals are reproduced in solid lines in FIG. 2L. Of course, the net signal present at the node Z will be the combination or algebraic sum of the outgoing and incoming waveforms, and thus will itself have the waveform shown as a broken line in FIG. 2L. It is this net signal which is rectified without filtering by the ideal rectifier 12.

The output of the ideal rectifier 11 (FIG. 2M) will be the same as that produced when only an outgoing signal is present (FIG. 2C). The output of the rectifier 12 will have the waveform shown in FIG. 2N. It consists of positive excursions corresponding to the positive excursions of the net signal (broken line of FIG. 2L) present at the node Z, but the output pulses will be of somewhat shorter phase extent, owing to the less than 180° conduction angle of the rectifier 12.

With both outgoing and incoming signals present, there will occur instants during which the ideal rectifier 12 will produce an output signal (FIG. 2N) at a time when no corresponding signal is produced by the ideal rectifier 11 (FIG. 2M). This is indicated by the waveform of FIG. 2P which represents the comparison signal formed within the comparator 13 by the effective subtraction of the FIG. 2M signal from the FIG. 2N signal. Each time such an instant occurs, the output of the comparator 13 will go high, as indicated by the waveform of FIG. 2Q. Such a high output will occur only when there is a signal incoming from the telephone line since, as discussed above in connection with FIGS. 2A–2E, in the presence of an outgoing signal only, the comparator 13 output always is low. Moreover, the comparator 13 will produce this high output in response to an incoming signal even though the outgoing signal, which may be of considerably greater amplitude, is simultaneously present. Thus the circuit of FIG. 10A ideally serves the function of detecting the presence of an incoming signal even while outgoing audio is being transmitted.

In the event that the mode control circuitry 9 includes a bistable latch, the high comparator output (FIG. 2P) may be used to switch the latch to its alternate stable state in which outgoing speech transmission is inhibited and incoming audio is amplified and reproduced. In such instance, the second output pulse in the waveform of FIG. 2P would conform in shape to the second output pulse of the rectifier 12 (FIG. 2N), since no outgoing signal then would be present at the node A, the microphone channel 5 having been disabled by the mode control latch. Of course, once the latch is set to the second stable state, occurrence of the second comparator output pulse does not alter its state.

The operational principles embodied in the idealized circuit 10A of FIG. 1 are employed in the practical speaker telephone 10 of FIG. 3 wherein components corresponding to those of FIG. 1 are identified by the same numerals. The op-amp comparator 13 is arranged in a circuit 15 which also functions as the bistable mode control latch. Thus the comparator/latch circuit 15 combines the functions of the comparator 13 and the mode control circuitry 9 of FIG. 1. Details of the speaker telephone 10 (FIG. 3) are next described.

The speaker telephone 10 is connected to the telephone line via the terminals 1 and 2. When the ON-OFF switch 16 is closed, the telephone line is loaded by the inductor 3. DC power is derived from the telephone line by means of a rectifier bridge 17 and a filter capacitor 18. A dc voltage having a value established by a zener diode 19 thus is provided between a +V line 20 and a ground line 21. This dc voltage powers the various circuits of the telephone 10.

The impedance element 6, the rectifiers 11 and 12 and the comparator/latch circuit 15 are included in an incoming audio seizure circuit 28. In the manner described above, the circuit 28 enables the interruption of outgoing speech by audio received from the telephone line. That is, if the distant party begins to speak while the user is talking, the circuit 28 will immediately detect this condition and will disable the microphone channel 5 and enable the speaker channel 7, thereby accomplishing break-in by the other party. A separate outgoing audio seizure circuit 29 responds to the difference in audio signals present at the speaker 8 and the microphone 4 so as to cause subsequent switchover from audio reception to audio transmission. The seizure circuits 28 and 29 thus provide a two-way interrupt capability for the speaker telephone 10.

Mode control is established by the comparator/latch circuit 15. When the circuit 15 is one stable state with its output line 14 high, an audio gate field effect transistor (FET) 32 is turned on, thereby enabling amplification by the speaker channel 7. The high signal on the line 14 supplied via a resistor 33 turns on a transistor 34 which in turns shuts off an audio gate FET 35 in the microphone channel 5. As a result, audio from the microphone 4 is not transmitted to the telephone line. When circuit 15 is in its alternate stable state, the line 14 is low, so that the incoming audio gate transistor 32 is off. This disables the speaker channel 7. The transistor 34 goes off, so that a positive bias voltage supplied via a resistor 36 turns on the FET 35. This enables audio from the microphone 4 to be amplified by the channel 5 and transmitted to the telephone line via an emitter follower 37 and the impedance element 6. The bistable circuit 15 remains in each stable state, despite pauses in speech, until an interruption by the other party.

In the speaker channel 7, audio from the terminal Z is supplied via a capacitor 38 to the source of the FET 32. The audio path from the drain of the FET 32 includes a capacitor 39, a volume control potentiometer 40, an amplifier 41, a capacitor 42 and the loudspeaker 8. The source and drain terminals of the FET 32 are connected to the +V line 20 via resistors 43 and 44. The gate of the FET 32 is connected to the circuit 15 via a resistor 47. With this arrangement the FET 32 conducts audio from the terminal Z to the speaker 8 when the line 14 is high, and inhibits such audio transmission when the line 14 is low.

In the microphone channel 5, bias for the microphone 4 is provided by a resistor 51. Audio from the microphone 4 is coupled via a capacitor 53 and a resistor 54 to a pre-amplifier transistor 55 having an associated microphone gain control potentiometer 56. The preamplified audio is supplied via a capacitor 59 to the audio gating FET 35. The source and drain of this FET 35 are connected to the +V line 20 via resistors 60 and 61.

When the circuit 15 provides a low output, the FET 35 passes the audio from the microphone 4 via a capacitor 63 to an amplifier 64. Its output is supplied via a capacitor 65 and a line 66 to the base of the emitter follower transistor 37. This base is biased by a divider consisting of two resistors 67, 68. As noted, the audio output of the emitter follower 37 (at node A) is supplied to the telephone line via the resistive impedance element 6.

In the embodiment of FIG. 3, the ideal rectifiers 11 and 12 are implemented by respective linear operational amplifiers 71 and 72 in each of which the non-inverting (+) input terminal is grounded. A feedback resistor 73, 74 is connected between each op-amp output terminal 71a, 72a and the respective inverting (−) output terminal, and the signal to be rectified is also fed to this (−) terminal. With this arrangement, the output terminal of each op-amp rectifier 71, 72 is constrained to remain at zero voltage when no signal is supplied from the respective node A or Z.

Audio from the node A is supplied to the op-amp rectifier 71 via a capacitor 75 and a resistor 76, the junction of which two components is connected to ground via a resistor 77. Similarly, audio from the node Z is supplied to the (−) input terminal of the op-amp rectifier 72 via a series connected capacitor 78 and resistor 79, the junction of which components is connected to ground via a resistor 80.

Each of the op-amp rectifiers 71, 72 differs from the corresponding ideal rectifier 11, 12 of FIG. 1 in that the portion of the signal which is passed by the op-amp rectifier is inverted in polarity. Thus if a sine wave signal were present at the node A, the negative polarity half waves of the signal would produce corresponding half wave outputs from the op-amp rectifier 71, but these would have positive polarity. The positive polarity half waves of the signal from the node A would produce no output at the terminal 71a. Thus as compared with FIGS. 2A and 2C, the op-amp rectifier 71 will produce output pulses that are synchronous in time with the negative-polarity half waves of the input signal, but which output pulses themselves are of positive polarity. A similar polarity inversion takes place in the op-amp rectifier 72 with respect to the audio signal from the node Z.

The op-amp rectifers 71 and 72 further differ from the ideal rectifiers 11, 12 of FIG. 1 in that they amplify as well as rectify. Thus the amplitudes of the output signals from the op-amp rectifiers 71 and 72 are greater in amplitude than their respective input signals. However, such amplification does not alter the operating principle of the circuit, so long as such amplification does not destroy the greater relative magnitude of a rectified outgoing signal from the node A with respect to the rectified signal derived from the node Z.

The input networks of the respective op-amp rectifiers 71 and 72 advantageously are used to control the rectifier conduction angle. Since the rectifiers 71 and 72 are capacitively coupled to the respective nodes A and Z, the following effect occurs. The coupling capacitor 75 associated with the op-amp rectifier 71 accumulates charge during the negative half cycle of the input signal resulting from conduction through the resistor 76 in series with the op-amp (−) input. During the positive half cycle, this charge on the capacitor 75 is discharged to ground through the shunt resistor 77. The average charge accumulation is related to the ratio of the values of the series resistor 76 to the shunt resistor 77. Such charge accumulation affects the conduction angle of the op-amp rectifier 71 and is a useful phenomenon, since by varying the resistance ratio it is possible to control the effective conduction angle.

Indeed, this is done in the circuit 28 to achieve the desired rectifier 11, 12 conduction angles described above. For example, the resistors 76 and 77 respectively may be 68 kohm and 22 kohm, and the capacitor 75 may have a value of 0.02 mfd resulting in a conduction angle for the op-amp rectifier 71 of about 170°. On the other hand, the resistors 79 and 80 associated with the op-amp rectifier 72 may respectively be 22 kohm and 220 kohm, providing a conduction angle of about 90°. In this manner, the preferred difference in conduction angle discussed above in connection with FIG. 1 is implemented.

Another way in which the op-amp rectifiers 71 and 72 differ from the ideal rectifiers 11 and 12 of FIG. 1 concerns the possible saturation of the op-amp circuits. At some incoming signal level it is possible that the op-amps will become saturated. It is advantageous that the saturation level of the op-amp rectifier 72 associated with the node Z be smaller than the saturation level of the op-amp 71 associated with the node A. This will ensure that with only an outgoing signal present, the output from the rectifier 72 will always be of lesser amplitude than the output from the rectifier 71 despite op-amp saturation. This is facilitated by the use of a silicon diode 89 connected between the output 72a and the (−) input terminal of the op-amp rectifier 72. Such a silicon diode has a typical forward voltage drop of about 0.6 volts. The diode 89 ensures that the clipping or saturation level of the op-amp rectifier 72 will be below that of the op-amp rectifier 71.

In the circuit 15, the comparator 13 is implemented by an operational amplifier 91 that also functions as the bistable mode control latch. The signals from the op-amp tifiers 71 and 72 are supplied to the op-amp 91 via the respective resistors 92 and 93. A feedback resistor 94 and a shunt capacitor 97 are connected between the output of the op-amp 91 and the inverting (−) input thereof. With this arrangement, whenever the signal supplied to the inverting (−) input of the op-amp 91 exceeds in magnitude the signal fed to the non-inverting (+) input, the output line 14 will be low. In the absence of any audio from either the microphone channel 5 or the telephone line, if the output terminal of the op-amp 91 should start to rise, the resultant signal fed back to the inverting (−) input via the resistor 94 will force the op-amp 91 output to remain at the low level. This is the first stable state of the comparator/latch circuit 15. The purpose of the capacitor 97 is to prevent noise from the telephone line from falsely switching the latch 15 to the incoming mode enable state.

If an audio signal is received from the telephone line during outgoing speech, an input signal will be provided to the non-inverting (+) input terminal of the op-amp comparator 91 at a time when no signal is supplied to the inverting (−) input. The output line 14 immediately will go high. This high signal will be fed back to the non-inverting (+) input terminal of the op-amp 91 via a diode 98 and a resistor 99 the value of which is less than that of the feedback resistor 94. As a result of this positive feedback, the output of the op-amp 91 on the line 14 will remain high. This is the second stable state of the comparator/latch circuit 15. As soon as the line 14 goes high, the microphone channel 5 is disabled and the speaker channel 7 is turned on. The speaker telephone 10 thus switches to the incoming mode, and remains in that mode until the latch circuit 15 is switched back to the outgoing mode by operation of the outgoing seizure circuit 29.

Although the foregoing operational description has been made with respect to sinusoidal signals, the system operation is the same for speech signals. Indeed, a speech waveshape can be represented as the sum of sinusoidal components. In analogy to the FIG. 2 description, on a probability basis, there will occur instants when the algebraic sum of the incoming and outgoing speech signals will be of such magnitude and polarity as to cause the rectifier 72 to provide a high output at a time when no (or a significantly lower) corresponding output is provided from the rectifier 71. This will cause the comparator 91 output to go high, exactly as required for incoming speech detection.

The circuit 29 allows the user of the speaker telephone 10 to interrupt the distant party. The circuit 29 operates when incoming speech is being reproduced by the loudspeaker 8. If the user should then talk into the microphone 4, the circuit 29 will detect this condition and cause the latch circuit 15 to revert back into its first stable state in which the microphone channel 4 once again is enabled.

To accomplish this, the circuit 29 compares a dc voltage of one polarity derived from the microphone 4 with a dc signal of the opposite polarity derived from the loudspeaker 8. So long as the user is not trying to interrupt the other party, the signal derived from the loudspeaker 8 will exceed that derived from the microphone 4 (which at the time is picking up only the audio from the loudspeaker 8 itself). The state of the latch circuit 15 will remain unchanged. When the user begins to speak into the microphone 4 during a pause between words or syllables of the incoming speech the dc voltage derived from the microphone will exceed that derived from the loudspeaker. An operational amplifier 110 will then produce via a resistor 111 a high output that turns on a transistor 112. This will shunt to ground the node between the feedback resistor 99 and the diode 98 of the circuit 15. As a result, the high output on the line 14 will no longer be fed back to the non-inverting (+) input of the op-amp 91. Feedback to the inverting (−) input terminal via the resistor 94 will now force the output of the op-amp 91 to go low, and will maintain this low output level. In this way, the high output from the amplifier 110 will cause the latch circuit 15 to revert to the state in which the microphone channel 5 is enabled.

In the seizure circuit 29 audio from the microphone 4 is amplified by an operational amplifier 113 operating in a linear or class A mode. This is accomplished by applying to the non-inverting (+) input terminal of the amplifier 113 a positive bias voltage that is about midway between ground and the +V level. The bias is derived by a voltage divider comprising a pair of resistors 114, 115. The microphone audio signal is supplied to the inverting (−) terminal of the amplifier 113 via a capacitor 116 and a resistor 117. Negative feedback is provided for the amplifier 113 via a resistor 118. Since the microphone preamplifier 55 is on the input side of the gating FET 35, the audio picked up by the microphone 4 is supplied to the amplifier 113 even while the microphone channel 5 is disabled.

The amplified microphone audio signal from the amplifier 113 is supplied via a resistor 119 and a capacitor 120 to a filtered rectifier circuit comprising a pair of diodes 121, 122, a filter capacitor 123 and a load resistor 124. The diodes 121, 122 are poled so that a positive dc voltage is obtained at a node 125.

Similarly, the audio signal from the loudspeaker 8 is supplied via a line 127, a capacitor 128 and a resistor 129 to the inverting (−) input of an operational amplifier 130 that is also biased to operate in a linear (class A) manner. Feedback is provided by a resistor 130. The amplified speaker audio then is supplied via a resistor 131 and a capacitor 132 to a filtered rectifier comprising a pair of diodes 133, 134, a filter capacitor 135 and a load resistor 136. The diodes 133, 134 are poled so as to produce a negative dc voltage at a node 137 that is indicative of the audio being reproduced by the loudspeaker 8.

This negative dc signal at the node 137 is compared with the positive dc signal at the node 125 which is indicative of the audio being picked up by the microphone 4. The comparison is performed at the summing point or non-inverting (+) input of the operational amplifier 110. The nodes 125 and 137 each are connected to the summing point 138 via a respective resistor 139, 140.

A small bias (typically 150 millivolts) is supplied to the inverting (−) input terminal of the amplifier 110. This is obtained by a voltage divider consisting of a resistor 143 connected to the +V source, and a resistor 144 connected to the collector of the transistor 34. When the telephone 10 is in the incoming audio mode, the transistor 34 is on so that the resistor 144 is essentially connected to ground. The resultant bias provided to the inverting (−) terminal of the amplifier 110 means that the voltage at the summing node 138 must rise above a commensurate level before the amplifier 110 provides a high output and causes the latch circuit 15 to switch states. This introduces a slight safety factor in that it requires that the dc signal derived from the microphone 4 exceed the dc signal derived from the loudspeaker 8 by more than the amount of the bias. It ensures that a change of state only occurs when the user actually begins talking into the microphone 4. The microphone gain potentiometer 56 may be factory adjusted to aid this operation.

The outgoing audio seizure circuit 29 is disabled when the telephone 10 is in the outgoing audio mode. At that time, the transistor 34 is off so that the collector of the transistor 34 is essentially at the +V level of a voltage supplied via the resistor 36. This +V voltage is now supplied via the resistor 144 to the inverting (−) input of the amplifier 110. As a result, the output of the amplifier 110 is forced to remain at a low level regardless of the voltage level at the summing point 138. Accordingly, the transistor 112 remains off and the latch circuit 15 remains unaffected by the outgoing audio seizure circuit 29.

This latter arrangement ensures that the speaker telephone 10 will not be locked into the outgoing audio mode in the event that there is substantially continuous background music or noise at the user's location. If the outgoing audio seizure circuit were not disabled, the presence of the background music or noise would maintain the output from the operational amplifier 110 high, and thereby maintain the transistor 112 on so as to prevent the latch circuit 15 from ever switching to the incoming audio state.

Although in the embodiment of FIG. 3 a bistable latch circuit 15 is used to control the audio gate FET's 35 and 32, the invention is not so limited. Instead of the comparator/latch circuit 15 it is possible to implement the mode control circuitry 9 (FIG. 1) in other ways. For example, the output of the comparator 13 may be used to charge a capacitor. The charge level on this capacitor in turn may be used to control the FET's 32 and 35. So long as the rectified but unfiltered signal derived from the node A exceeds in magnitude and encompasses the rectified signal derived from the node Z, the comparator output will maintain the capacitor at a sufficiently low charge level to maintain the FET 35 on and maintain the FET 32 off. This is the outgoing audio condition of the speaker telephone.

When the rectified signal derived from the node Z exceeds that derived from the node A, indicative of the presence of incoming audio during outgoing speech, the comparator op-amp output level will change, tending to discharge the capacitor. Condition of the FET's 32 and 35 will change so as to switch the telephone to the incoming audio mode. In this non-bistable-latch embodiment, the outgoing audio seizure circuit 29 may not be required.

I claim:

1. A circuit for use in a speaker telephone of the type having telephone line terminals connectable to a telephone line, a microphone and a microphone amplifier for amplifying speech from the microphone for transmission to the telephone line via said terminals, said circuit being used for detecting the presence of audio incoming from the telephone line while outgoing speech is being amplified by said microphone amplifier and transmitted to the telephone line, said circuit comprising:
    an impedance element having one node connected to a telephone line terminal of said speaker telephone at which terminal both the outgoing speech and the incoming audio appear, and having a second node connected to the output of said microphone amplifier, the effective amplitude of outgoing speech being greater at the node of said impedance element which is connected to said microphone amplifier output than at the node of said impedance element which is connected to said telephone line terminal,
    first rectifier means for rectifying without filtering the audio present at said impedance element node connected to said telephone line terminal,
    second rectifier means for rectifying without filtering the audio present at said impedance element node connected to said microphone amplifier output, and
    comparator means for comparing on a cycle by cycle basis the signals from said first and second rectifier means and for producing a comparator output signal only when the rectified but unfiltered signal from said first rectifier means exceeds that from said second rectifier means, this condition being indicative of the presence of incoming audio, the operational mode of said speaker telephone being switched from outgoing speech transmission to incoming audio reception in response to said produced output signal.

2. A circuit according to claim 1 wherein the output of said microphone amplifier presents a very low impedance load to audio incoming from the telephone line.

3. A circuit according to claim 1 or 2 wherein the effective conduction angle of said second rectifier means is greater than that of said first rectifier means.

4. A circuit for use in a speaker telephone having a microphone amplifier, said circuit being used for detecting the presence of audio incoming from a telephone line while outgoing speech is being amplified by said microphone amplifier and transmitted to the telephone line, said circuit comprising:
    an impedance element connected between the telephone line and the output of said microphone amplifier,
    first rectifier means for rectifying without filtering the audio present at said telephone line,
    second rectifier means for rectifying without filtering the audio present at the output of said microphone amplifier, the effective conduction angle of said second rectifier means being greater than that of said first rectifier means, and
    comparator means for comparing the signal from said first and second rectifier means and for producing an output signal only when the rectified but unfiltered signal from said first rectifier means exceeds that from said second rectifier means, this condition being indicative of the presence of incoming audio, the operational mode of said speaker telephone being switched from outgoing speech transmission to incoming audio reception in response to said produced output signal.

5. In a speaker telephone of the type in which speech picked up by a microphone is amplified in a microphone amplification channel for transmission to a telephone line, and in which audio incoming from the telephone line is amplified for loudspeaker reproduction in a speaker amplification channel connected to the telephone line, the improvement for detecting audio incoming from the telephone line during outgoing speech transmission comprising:
    an impedance element connected between the output of said microphone amplification channel and said telephone line, said outgoing speech being transmitted via said impedance element,
    a first operational amplifier rectification circuit connected to rectify without filtering the signal present at said telephone line,
    a second operational amplifier rectification circuit connected to rectify without filtering the signal from the output of said microphone amplification channel, the effective angle of said second rectification circuit being greater than that of said first rectification circuit, and an operational amplifier comparator circuit receiving as inputs to be compared the outputs of said first and second rectification circuits, and providing an output signal only when the output of said first rectification circuit exceeds the output of said second rectification circuit, said provided output signal being used to switch said speaker telephone from the outgoing speech transmission mode to the incoming audio reproduction mode.

6. A speaker telephone according to claim 5 wherein said operational amplifier comparator circuit has two stable states and is switched from a first of said states to the other of said states when the output of said first rectification means exceeds the output of said second rectification means, said output signal being provided only when said comparator circuit is in said other state.

7. A speaker telephone according to claim 5 further comprising a circuit responsive to the pick-up of speech by said microphone during a quiescent period of the audio incoming from said telephone line, comprising:

a first rectifier connected to provide a dc envelope signal of a first polarity corresponding to speech detected by said microphone, and a second rectifier connected to provide a dc envelope signal of opposite polarity in response to audio reproduced by said loudspeaker, summing means for combining said first and second opposite polarity signals and for providing an output when the summed value is of polarity corresponding to that provided by said first rectifier, said output from said summing means being used to switch said speaker telephone from the incoming audio reproduction mode back to the outgoing speech transmission mode.

* * * * *